ADHESIVE DISPENSING APPARATUS FOR SHOE MACHINES

Original Filed May 24, 1961

INVENTOR.
Alan G. Baker
BY Albert Gordon ATT'Y

ADHESIVE DISPENSING APPARATUS FOR SHOE MACHINES

Original Filed May 24, 1961

United States Patent Office

Re. 26,559
Reissued Mar. 25, 1969

26,559

ADHESIVE DISPENSING APPARATUS FOR SHOE MACHINES

Alan G. Baker, Plymouth, Mass., assignor to Jacob S. Kamborian, West Newton, Mass.

Original No. 3,146,126, dated Aug. 25, 1964, Ser. No. 112,417, May 24, 1961. Application for reissue Aug. 1, 1966, Ser. No. 579,442
Int. Cl. B05c *11/00, 3/02*
U.S. Cl. 118—2 8 Claims

Matter enclosed in heavy brackets [ ] appears in the original patent but forms no part of this reissue specification; matter printed in italics indicates the additions made by reissue.

*ABSTRACT OF THE DISCLOSURE*

*There is disclosed herein an apparatus for extruding a variable amount of adhesive from a chamber onto a workpiece in response to the movement of a plunger toward the chamber. A control is provided to terminate the movement of the plunger toward the chamber and impart immediate movement of the plunger away from the chamber to thereby stop the adhesive extrusion and enable adhesive to be drawn from a supply source into the chamber.*

The primary object of this invention is to provide an apparatus for dispensing molten thermoplastic adhesive through a nozzle in variable amounts in connection with the bonding of the margin of a first workpiece to a surface of a second workpiece. The invention is primarily intended to be used in conjunction with the lasting of shoes in accordance with the mode of operation disclosed in Patent No. 2,843,863 wherein the first workpiece is the margin of a shoe upper that is concomitantly pulled heightwise of a last and fed forwardly by a pair of gripping rolls, and the second workpiece is an insole tacked to the bottom of the last. The invention also has utility in supplying adhesive into the angle between the margin of a covering material and a panel in a machine for bonding the covering material to the panel similar to that illustrated in Patent No. 2,667,908. Other uses for the invention will become apparent from a reading of the following specification and appended claims.

The apparatus comprises a pot having a melting chamber. A small diameter conduit connects the chamber to a nozzle and a larger diameter passage connects the chamber to a well. A plunger is slidably mounted in an orifice in the pot that intersects the chamber and a motor is connected to the plunger to reciprocate it toward and away from the chamber. A plurality of electric heating cartridges are located in the pot. A valve is positioned beneath the passage to normally leave the passage open but movable under pressure to block the passage.

Adhesive placed in the well is melted by the heating cartridges and flows through the passage into the chamber. Forward movement of the plunger in the orifice towards the chamber creates a pressure to cause the valve to close the passage and at the same time force the molten adhesive from the chamber through the conduit to the nozzle. Rearward movement of the plunger away from the chamber creates a suction force that terminates extrusion of the adhesive from the nozzle and at the same time moves the valve to open the passage and draws adhesive from the well into the chamber.

Reference is now had to the accompanying drawings wherein.

Figure 1:
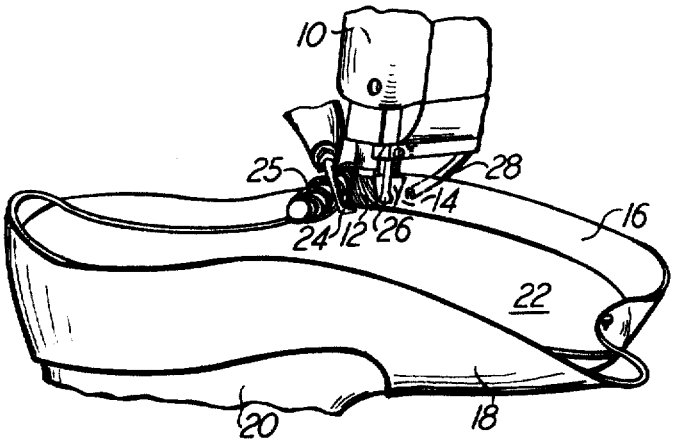
FIG. 1 is a perspective view of a lasting machine of the kind with which the invention is used.

FIG. 1 shows the operating head 10 of a lasting machine, similar to those illustrated in Patent Numbers 2,571,140 and 2,667,908, which supports for rotation in opposite directions a pair of work grippings rolls 12 and 14 which engage the opposite sides of the lasting margin 16 of an upper 18 mounted on a last 20. An insole 22 is secured by tacks or other securing means to the bottom of the last. The roll 12 is tapered upwardly, the roll 14 is tapered downwardly, and both rolls are inclined to the vertical so as to produce an updrafting stress on the lasting margin as it is advanced between the rolls as is customary in this type of machine. Adhesive is supplied to and discharged from the end of a nozzle 24, an end of which is located beneath the roll 12 and forwardly of the bite of the rolls to discharge the adhesive within the angle between the stressed lasting margin and the insole. A fixed wiper or folding blade (not shown) similar to the folding blade 26 shown in Patent No. 2,667,908 extends beneath the rolls 12, 14 to initiate the folding or wiping of the stressed lasting margin as it exits from the rolls 12, 14. A rotatable wiper 25, having a helical rib at its periphery serves to lay the stressed margin 16 onto the insole 22 and adhesively bond the margin to the insole. A pair of pipes 26 and 28 are located forwardly of the rolls 12, 14 on opposite sides of the margin 16 to automatically sense the presence of a course of the margin 16 and control the extrusion of the adhesive from the nozzle 24 upon the presentation of the margin to the rolls by the use of a switching mechanism similar to that shown in Patent No. 2,843,863 and described more fully below.

Figure 2:
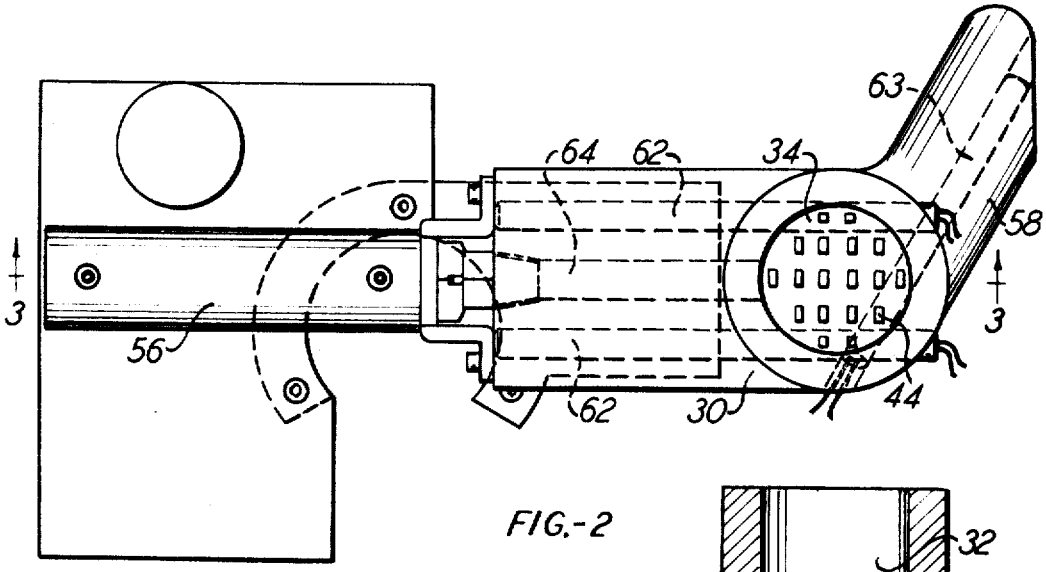
FIG. 2 is a plan view of the adhesive dispensing apparatus.
Figure 3:
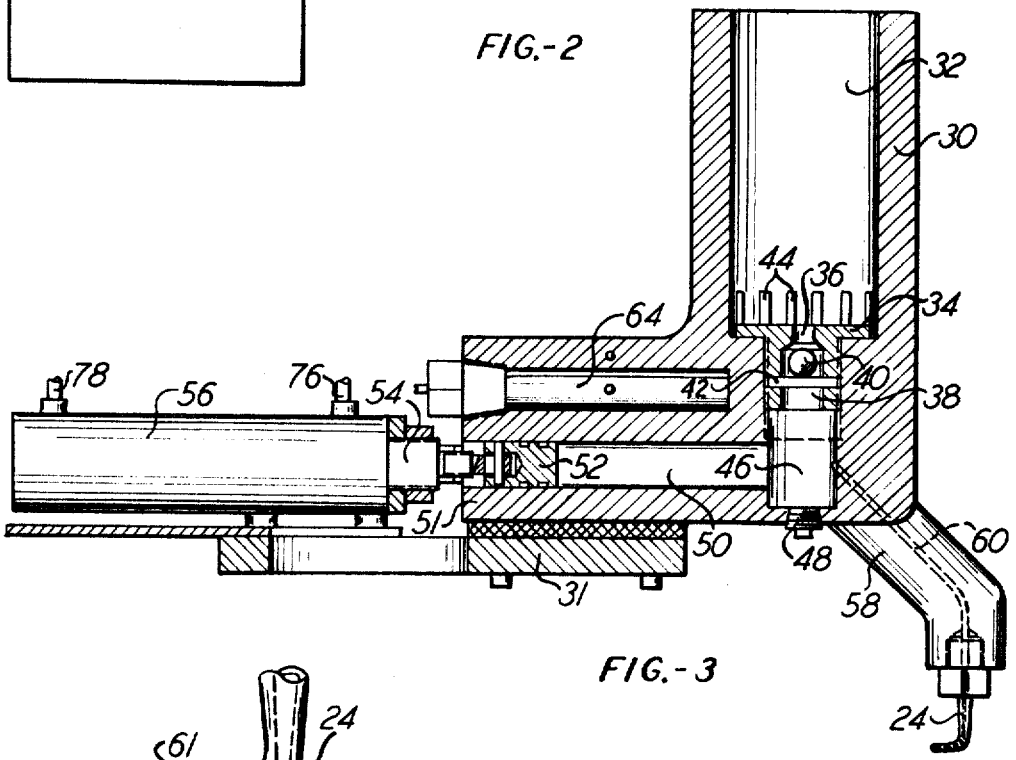
FIG. 3 is a side elevation partly in section taken along the line 3—3 of FIG. 2.
Figure 4:
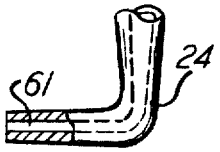
FIG. 4 is a detail to an enlarged scale of the nozzle shown in FIG. 3.

FIGS. 2 and 3 illustrate the means for supplying molten adhesive to the nozzle 24. This comprises a pot 30 mounted on a base 31. The pot is made of a heat conductive material such as aluminum and includes a well 32 in which a solid column of adhesive, either in the form of a single cylinder or a plurality of small crystals, may be placed. An adhesive support 34 is threaded into a hole in the bottom of the well 32. The support 34 has a centrally located small diameter passage 36 that opens into a large diameter passage 38. A ball 40, resting on a pin 42 extending across the passage 38, is cooperative with the passage 36 to act as a valve in the manner described below. The support 34 has a plurality of nodes 44 extending upwardly therefrom on which the solid adhesive rests. The passage 38 opens into a chamber 46 having a drain plug 48 at its bottom. An orifice 50 extends from the side 51 of the pot 30 and intersects the chamber 46. A plunger 52, connected to the piston rod 54 of an air operated motor 56 mounted on the base 31, is slidably mounted in the orifice 50. The pot has a downwardly extending projection 58 to the lower end of which the nozzle 24 is secured. A conduit 60 extends through the projection 58 to provide communication between the chamber 46 and the conventional conduit 61 (FIG. 4) in the nozzle 24. The conduits 60 and 61 have a smaller cross-sectional area than the passages 36 and 38. A pair of electric cartridge heaters 62 are located in holes in the pot 30 alongside of and on opposite sides of the orifice 50 and chamber 46 and below the well 32, and a third cartridge heater 63 is provided in a hole in the projection 58. The heaters are controlled by a thermostat 64 located in a hole in the pot above the orifice 50.

Solid thermoplastic adhesive is placed in the well 32 to rest on the nodes 44. The thermostat 64 is set to control the heaters 62 and 63 to melt the adhesive and maintain it molten at a predetermined temperature, which with certain types of adhesives ranges up to 600° F. The column of solid adhesive in the well 32 melts from the bottom with the molten adhesive flowing through the crevices between the nodes 44 and through the passages 36, 38 into the chamber 46 to substantially fill the chamber. Actuation of the motor 56 to move the plunger 52 forwardly from its FIG. 3 position creates a pressure to force ball 40 up against the passage 36 to block further flow of molten adhesive in the chamber, and, at the same time, force molten adhesive from the chamber 46 through the conduits 60 and 61 and through the nozzle 24. The closing of the passage 36 prevents back flow of adhesive upwardly therethrough. The heater 63 maintains the adhesive molten during its passage through the conduit 60.

The plunger 52 may be moved rearwardly (leftwardly in FIG. 3) at any time prior to its reaching the forward end of the orifice 50, and in doing so immediately creates a suction in the conduits 60 and 61 to cause a reverse flow of the adhesive in the conduits and terminate the extrusion of the adhesive from the nozzle. The adhesive used has a relatively high viscosity and tends not to flow downwardly through the conduits in the absence of a superatmospheric pressure. Therefore, there is substantially no drip of adhesive from the nozzle until plunger 52 is again moved forwardly. The suction force created by the rearward movement of the plunger 52 also causes the ball 40 to move downwardly against the pin 42 to thereby open the passages 36, 38 and draws molten adhesive from the well 32 into the chamber 46 to refill the chamber, the orifice 50 and the conduit 60 with molten adhesive. The area of the passage around the ball 40 is sufficiently larger than the cross-sectional area of the conduits 60 and 61 to permit flow of adhesive through the passages 36 and 38 despite the relatively high viscosity of the adhesive.

Figure 5:
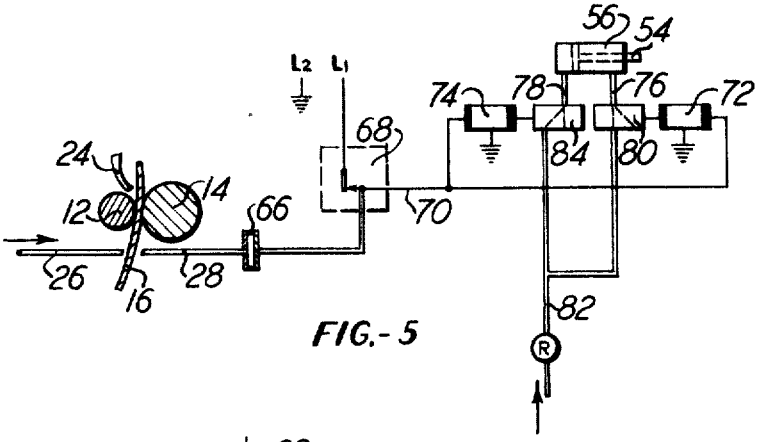
FIG. 5 is a diagrammatic view of the control means for operating the adhesive dispensing apparatus when it is operative to cause the dispensing of adhesive.
Figure 6:
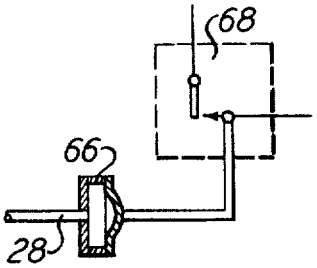
FIG. 6 is a diagrammatic view of a diaphragm and switch of the control means in idle position.

The control circuit shown in FIGS. 5 and 6 is used to cause a forward projection of the plunger 52 upon the presentation of the margin 16 of the upper to the rolls 12, 14 to cause a flow of adhesive through the nozzle 24, and to cause a rearward retraction of the plunger upon the termination of the movement of the margin through the rolls to automatically stop the flow of adhesive through the nozzle. The pipe 26 is supplied with air pressure from a source (not shown) which normally blows through the pipe 28 against a diaphragm 66 to distend the diaphragm as indicated in FIG. 6. The diaphragm is connected to a movable contact of a switch 68 so as to maintain the switch normally open. The switch 68 is in series with a source of power labelled L1, L2 and a line 70 that is connected to a pair of solenoids 72 and 74. The motor 56 has a line 76 at its forward end and a line 78 at its rearward end. The line 76 is connected through a normally open three way valve 80 to a line 82 that is connected to the source of air pressure. The line 78 is connected through a normally closed three way valve 84 to the line 82.

Normally, with no work positioned between the pipes 26, 28, the diaphragm 66 is distended, the switch 68 is open, and the solenoids 72, 74 are deenergized. In this position, air flows through the valve 80 and the line 76 to maintain the piston rod 54 retracted and the plunger 52 in the FIG. 3 position. The presentation of the margin 16 to the rolls 12, 14 interrupts the flow of air through the pipe 28 and causes the diaphragm to collapse due to its inherent resilience and thereby closes the switch 68 as indicated in FIG. 5. The closing of the switch 68 energizes the solenoids 72 and 74 to close the normally open valve 80 and to open the normally closed valve 84 to thereby cause air to enter the motor 56 through the line 78 and move the piston rod 54 and plunger 52 forwardly.

In the manner described above, forward movement of the plunger immediately causes the extrusion of molten adhesive through the nozzle 24 into the angle formed between the lasting margin 16 and insole 22. As soon as the lasting margin is no longer presented between the pipes 24 and 26, the switch 68 is opened, the solenoids 72 and 74 are deenergized, the valve 80 is reopened and the valve 84 is closed. This causes air to enter the motor 56 through the line 76 to stop the rightward movement of the plunger 52 at whatever position it had assumed at that time and immediately impart rearward movement to the plunger to return it to its original position. As soon as the plunger starts moving rearwardly, flow of adhesive through the nozzle 24 ceases and molten adhesive commences to flow from the well 32 into the chamber 46 in the manner described above. The lasting margin 16, the chamber 46 and the orifice 50 are so dimensioned that in normal operation the plunger 52 will be retracted prior to its reaching its extreme forward position.

It should be understood that the present disclosure is for the purpose of illustration only and that this invention includes all modifications and equivalents that come within the scope of the appended claims.

I claim:

1. An adhesive dispensing apparatus comprising: a pot; a chamber in *the* pot; a projection extending away from the chamber; a nozzle secured to the projection; a conduit extending through the projection from the chamber to the nozzle; an orifice intersecting the chamber; a plunger slidably mounted in the orifice; powered means for reciprocating the plunger in the orifice toward and away from the chamber; a well in said pot for storing adhesive; a passage in said pot interposed between the well and the chamber through which the adhesive flows from the well to the chamber; valve means associated with the passage normally permitting flow of adhesive therethrough and operative in response to movement of the plunger toward the chamber to block the passage; control means for controlling the operation of said powered means; means responsive to actuation of said control means to cause the powered means to move the plunger forwardly toward the chamber; and means operative at any time during the forward movement of the plunger to deactuate said control means to cause the powered means to terminate the forward movement of the plunger at the position it had assumed at the time of deactuation[.] *and impart immediate rearward movement to the plunger to thereby terminate the extrusion of the adhesive and return the valve means to its normal position thus enabling adhesive to be drawn into the chamber from the well.*

2. An adhesive dispensing apparatus comprising: a pot; a chamber in the pot; a projection extending away from the chamber; a nozzle secured to the projection; a conduit extending through the projection from the chamber to the nozzle; a well in said pot positioned above the chamber; an adhesive support in the well; a passage in the adhesive support interconnecting the well and the chamber; valve means normally located spacedly from the passage; means supporting the valve means to enable it to move *from a position normally permitting flow of adhesive therethrough to a position wherein said valve means is in* [into] blocking relation with respect to the passage upon the application of pressure to the chamber; an orifice in the pot intersecting the chamber; a plunger slidably mounted in the orifice; powered means for reciprocating the plunger in the orifice toward and away from the chamber; control means for controlling the operation of said powered means; means responsive to actuation of said control means to cause the powered means to move the plunger forwardly toward the chamber and apply pressure to the chamber *thereby moving said valve means into blocking relation with respect to said passage and effecting a dispensing of adhesive from said nozzle;* and means operative at any time during the forward movement of the plunger to deactuate said control means to cause the powered means to terminate the forward movement of the plunger at the position it had assumed at the time of deactuation[.] *and impart immediate rearward movement to the plunger to thereby terminate the dispensing of adhesive and return the valve means to its normal position to enable adhesive to be drawn into the chamber from the well.*

3. An adhesive [dispenser] *dispensing* apparatus comprising: a base; a pot mounted on the base; a chamber in the pot; a projection extending downwardly of the chamber; a nozzle secured to the projection; a conduit extending through the projection [form] *from* the chamber to the nozzle; a well in said pot positioned above the chamber; an adhesive support located in the bottom of the well; a passage in the adhesive support interconnecting the well and the chamber; valve means located spacedly from the passage; means supporting the valve means to enable it to move *from a position normally permitting flow of adhesive therethrough to a position wherein said valve means is in* [into] blocking relation with respect to the passage upon the application of pressure to the chamber; an orifice in the pot intersecting the chamber; a fluid actuated motor, having a piston rod, mounted on the base; a plunger, slidably mounted in the orifice, connected to the piston rod; operating means to supply fluid under pressure to the motor to reciprocate the plunger in the orifice; heating means in the pot for melting solid adhesive in the well and maintaining molten adhesive that has moved from the well into the chamber; control means for controlling the operation of said operating means; means responsive to actuation of said control means to enable the operating means to supply fluid under pressure to the motor to move the plunger forwardly toward the chamber and apply pressure to the chamber *thereby moving said valve means into said blocking relation with respect to the passage and effecting a dispensing of adhesive through said nozzle;* and means operative at any time during the forward movement of the plunger to deactuate said control means to cause the operating means to terminate supplying fluid under pressure to the motor and, thereby, terminate the forward movement of the plunger at the position it had assumed at the time of deactuation[.] *and impart immediate rearward movement to the plunger to thereby terminate the extrusion of adhesive and return the valve means to its normal position to enable adhesive to be drawn into the chamber from the well.*

4. In a machine for adhesively bonding the margin of one workpiece to a surface of a second workpiece, the machine having a nozzle through which adhesive is extruded onto at least one of the workpieces past which the workpieces are moved, means for extruding the adhesive from said nozzle comprising: a pot; a chamber in said pot in communication with said nozzle; means for supplying adhesive to said chamber; an orifice in said pot intersecting the chamber; a plunger slidable in the orifice; powered means for reciprocating the plunger toward and away from the chamber; *valve means associated with said means for supplying adhesive to said chamber, said valve means normally permitting flow of adhesive through said supplying means and being operative in response to movement of the plunger toward the chamber to block said supplying means;* control means for controlling the operation of said powered means; means responsive to actuation of said control means to cause the powered means to move the plunger forwardly towards the chamber; and means operative at any time during the forward movement of the plunger to deactuate said control means to cause the powered means to terminate the forward movement of the plunger at the position it had assumed at the time of deactuation[.] *and impart immediate rearward movement to the plunger to thereby terminate the extrusion of adhesive and return said valve means to its normal position to enable adhesive to be drawn into the chamber from the well.*

5. The machine according to claim 4 further comprising: sensing means located behind the nozzle with respect to the direction of workpiece movement; means responsive to the movement of a course of the margin past the sensing means to actuate said control means; and means responsive to the termination of the movement of the course of the margin past the sensing means to effect the [reactuation] *deactuation* of said control means.

6. In a machine for adhesively bonding the margin of one workpiece to a surface of another workpiece, said machine having a nozzle through which adhesive is extruded onto at least one of the workpieces and past which the workpieces are moved [;], means for extruding the adhesive from said nozzle comprising: a pot; a chamber in said pot; a conduit extending from the chamber to said nozzle; a well in said pot positioned above the chamber; an adhesive support in the well; a passage in the adhesive support interconnecting the well and the chamber; valve means normally located spacedly from the passage; means supporting the valve means to enable it to move [into] *from a position normally permitting flow of adhesive therethrough to a position wherein said valve means is in* blocking relation with respect to the passage upon the application of pressure to the chamber; an orifice in the pot intersecting the chamber; a motor having a driven element; a plunger slidable in the orifice toward and away from the chamber, said plunger being connected to the driven element; control means for controlling the operation of said motor and normally maintaining it so that the plunger is in a rearward position remote from the chamber; means responsive to actuation of the control means to operate the motor to move the plunger forwardly toward the chamber to thereby cause the valve means *to move into blocking relation with respect to the passage* to close the passage and concomitantly extrude adhesive from the chamber through the nozzle; and means operative at any time during the forward movement of the plunger to deactuate the control means to cause the motor to terminate the forward movement of the plunger at the position it had assumed at the time of deactuation and *immediately* move the plunger rearwardly to its initial position to thereby terminate the extrusion of adhesive through the nozzle, return the valve means to its normal position and draw adhesive into the chamber from the well.

7. In a machine for adhesively bonding the margin of one workpiece to a surface of another workpiece, said machine having a nozzle through which adhesive is extruded onto at least one of the workpieces and past which the workpieces are moved, means for extruding the adhesive from said nozzle comprising: a base; a pot mounted on said base; a chamber in said pot; a projection extending downwardly of the chamber; means connecting said nozzle to said projection; a conduit extending through the projection from the chamber to the nozzle; a well in said pot positioned above the chamber; an adhesive support in the well; a passage in the adhesive support interconnecting the well and the chamber; valve means normally located spacedly from the passage; means supporting the valve means to enable it to move *from a position normally permitting flow of adhesive therethrough to a position wherein said valve means is in* [into] blocking relation with respect to the passage upon the application of pressure to the chamber; an orifice in the pot intersecting the chamber; a fluid actuated motor, having a driven piston rod, mounted on the base; a plunger slidable in the orifice toward and away from the chamber, said plunger being connected to the piston rod; control means for controlling the motor normally maintaining the plunger in a rearward position remote from the chamber; sensing means located in advance of the nozzle with respect to the direction of workpiece movement; means responsive to the movement of a course of margin past the sensing means to actuate the control means to cause the motor to move the plunger forwardly toward the chamber to thereby cause the valve means to *move into said blocking relation with respect to the passage* to close the passage and concomitantly extrude adhesive from the chamber through the nozzle; and means operative at any time during the forward movement of the plunger and responsive to the termination of the movement of the course of the margin past the sensing means to deactuate the control means to cause the motor to terminate the forward movement of the plunger at the position it had assumed at the time of deactuation and *immediately* move the plunger rearwardly to its initial position to thereby terminate the extrusion of adhesive through the nozzle, return the valve means to its normal position and draw adhesive into the chamber from the well.

8. An adhesive dispensing apparatus comprising: a pot; a chamber in the pot; a projection extending away from the chamber; a nozzle secured to the projection; a conduit extending through the projection from the chamber to the nozzle; a well in the pot; adhesive support means located in the bottom of the well; a passage in the adhesive support means interconnecting the well and the chamber; an orifice in the pot intersecting the chamber; a motor having a driven element; a plunger slidable in the orifice toward and away from the chamber, said plunger being connected to the driven element; means for actuating the motor to reciprocate the plunger in the orifice; valve means associated with the passage normally permitting flow of adhesive therethrough and operative in response to movement of the plunger toward the chamber to block the passage; heating means in the pot for melting solid adhesive in the well and maintaining molten adhesive that has moved from the well into the chamber; control means for controlling the operation of said motor actuating means; means responsive to actuation of said control means to enable the motor actuating means to move the plunger forwardly toward the chamber; and means operative at any time during the forward movement of the plunger to deactuate said control means to cause the motor actuating means to terminate the forward movement of the plunger at the position it had assumed at the time of deactuation[.] *and impart immediate rearward movement to the plunger to thereby terminate the extrusion of adhesive and return the valve means to its normal position to enable adhesive to be drawn into the chamber from the well.*

References Cited

The following references, cited by the Examiner, are of record in the patented file of this patent or the original patent.

UNITED STATES PATENTS

| | | | |
|---|---|---|---|
| 1,122,616 | 12/1914 | Kuebler et al. | 118—408 |
| 2,764,956 | 10/1956 | Burnett et al. | 118—323 X |
| 2,781,020 | 2/1957 | Scott | 118—301 X |
| 2,809,772 | 10/1957 | Weisz. | |
| 2,843,863 | 7/1958 | Weisz | 118—2 X |
| 2,876,734 | 3/1959 | Nitchie | 118—249 |
| 3,023,726 | 3/1962 | Kamborian | 118—2 |
| 3,056,384 | 10/1962 | Beale et al. | 118—411 |
| 483,367 | 9/1892 | Robertson | 239—331 |
| 1,047,791 | 12/1912 | Gregg et al. | 239—127 |
| 1,586,770 | 6/1926 | Baddux et al. | 222—61 |
| 1,984,296 | 12/1934 | Witter | 222—43 |
| 2,893,026 | 7/1959 | Sillars et al. | 12—142 |
| 2,973,740 | 3/1961 | Hopkins et al. | 118—303 |
| 3,092,330 | 6/1963 | Ridenour et al. | 239—333 |

FOREIGN PATENTS

| | | |
|---|---|---|
| 456,364 | 11/1936 | Great Britain. |

WALTER A. SCHEEL, *Primary Examiner.*

R. I. SMITH, *Assistant Examiner.*

U.S. Cl. X.R.

118—410

UNITED STATES PATENT OFFICE
CERTIFICATE OF CORRECTION

Patent No. Re. 26,559 Dated March 25, 1969

Inventor(s) Alan G. Baker

It is certified that error appears in the above-identified patent and that said Letters Patent are hereby corrected as shown below:

Column 5: line 75, change "from the well" to --through said supplying means--.

Signed and sealed this 13th day of July 1971.

(SEAL)
Attest:

EDWARD M.FLETCHER,JR.
Attesting Officer

WILLIAM E. SCHUYLER, JR.
Commissioner of Patents

FORM PO-1050 (10-69)

USCOMM-DC 60376-P69
☆ U.S. GOVERNMENT PRINTING OFFICE : 1969 O—365-334